US006947662B1

(12) United States Patent
Shibata et al.

(10) Patent No.: US 6,947,662 B1
(45) Date of Patent: Sep. 20, 2005

(54) PICTURE MAPPING SYSTEM

(75) Inventors: Youichi Shibata, Niigata-ken (JP); Kazunobu Toriyama, Niigata-ken (JP); Ryouji Sasaki, Niigata-ken (JP)

(73) Assignee: Incorporated Administrative Agency National Agriculture and Bio-Oriented Research Organization, Ibaraki (JP)

( * ) Notice: Subject to any disclaimer, the term of this patent is extended or adjusted under 35 U.S.C. 154(b) by 922 days.

(21) Appl. No.: 09/691,034

(22) Filed: Oct. 19, 2000

(30) Foreign Application Priority Data

Oct. 22, 1999 (JP) ................................. 11-301173

(51) Int. Cl.⁷ ............................ H04N 5/76; H04N 7/04; H04N 5/91
(52) U.S. Cl. ........................... 386/117; 386/107; 386/46
(58) Field of Search ........................ 386/117, 118, 107, 386/124, 46, 38, 40, 1; 701/213, 211; 340/995.12; 348/143, 148

(56) References Cited

U.S. PATENT DOCUMENTS

| | | | | |
|---|---|---|---|---|
| 6,083,353 A | * | 7/2000 | Alexander, Jr. ............. 202/158 |
| 6,133,947 A | * | 10/2000 | Mikuni ........................ 348/143 |
| 6,182,010 B1 | * | 1/2001 | Berstis ........................ 701/211 |
| 2003/0065444 A1 | * | 4/2003 | McCarthy et al. .......... 701/213 |
| 2003/0122930 A1 | * | 7/2003 | Schofield et al. ........... 348/148 |

* cited by examiner

Primary Examiner—Robert Chevalier
(74) Attorney, Agent, or Firm—Arent Fox

(57) ABSTRACT

A picture mapping system comprises a vehicle adapted to travel on an agricultural field; a camera mounted on the vehicle for continuously taking pictures of various portions of the agriculture field; a computer mounted on the vehicle for receiving and processing pictures taken by the camera; and GPS receiver means for receiving information signals transmitted from GPS satellites and/or GPS base stations. In particular, the camera is moved continuously by the vehicle travelling on the field, the pictures taken by the camera are continuously fed into the computer, positional information signals transmitted from GPS satellites and/or GPS base stations are also fed to the computer to determine the positions and the orientations of various pictures taken by the camera device, thereby synthesizing together the pictures on the display of the computer to obtain an overall picture representing the entire field.

5 Claims, 8 Drawing Sheets

DETECTABLE RANGE OF A VIDEO CAMERA
IN VEHICLE'S PROCEEDING DIRECTION

PICTURE MAPPING SYSTEM

BACKGROUND OF THE INVENTION

The present invention relates to a picture mapping system capable of taking picture of an entire agricultural field, also capable of providing some enlarged local pictures showing in detail some local portions of the field.

In order to ensure a stabilized quality and a stabilized yield for agricultural crops, it is required to establish a field management system which can constantly monitor a crop growing environment and a crop growing state, and can also control some changes thereof by converting these changes into numerical values, so as to carry out a crop cultivation management by dealing with these values. On the other hand, to investigate a crop growing environment and a crop growing state, it is effective to perform an analysis of picture data containing a large amount and various kinds of field information. Here, so-called picture data is a sort of two-dimensional information obtainable from visible and non-visible lights.

There has been known a picture taking method called aerial photographing which involves the use of an unmanned aircraft. This method has been proved to be effective in collecting a large amount of picture information since it can have a large-scaled agricultural field to be taken in only one picture. However, the aerial photographing has been associated with the following problems. That is, an operation for such an aerial photographing is sometimes restricted by a wether condition including wind and sunlight. Moreover, the photographing operation itself requires a high cost, because it requires highly skilled technicians including pilots and other skilled persons for the control and safety confirmation of various photographing equipments.

On the other hand, another picture taking method is called ground photographing. When this method is used to take picture, since a distance between a field and a camera is very short, a larger resolution can be obtained than the above aerial photographing method, thereby making it sure to obtain very detailed information including growing state of each individual crop. However, when a camera is in a position facing straight downwardly, one photo can include only a small area of field. If a two-dimensional picture of an entire agricultural field is to be obtained, a large amount of local pictures will have to be synthesized in a picture synthesizing process performed on a computer. For this reason, it is necessary to accurately measure the position and orientation of each local picture. Alternatively, it is necessary to repeat the photographing operation for several times by correctly moving a video camera a predetermined distance, with the orientation of the video camera kept constant. For example, when a video camera having a visual field of 4 m×4 m is used to take pictures of a field having an area of 1 ha (10000 m$^2$), at least 625 pictures will have to be taken and synthesized together. As a result, if there is not an effective means for measuring the positions and orientations of the pictures taken, it is extremely difficult to move a video camera by 4 m each time (while at the same time keeping it facing in a correct direction).

Although it is possible for the ground photographing method to take a picture of an entire filed (if a video camera is positioned above the field forming an inclined line between the field and the camera), a picture taken will vary in its size depending on a distance between the camera and the field. As a result, it is necessary to correct some distortions of a picture taken, in order to avoid any possible error in an analytical process for analyzing a crop growing state.

SUMMARY OF THE INVENTION

It is an object of the present invention to provide an improved photographing system (picture mapping system) which can operate at a low cost, with the photographing operation itself not influenced by the wether condition. In particular, this invention is to provide a ground photographing system which can be operated by only one person, but can produce two-dimensional picture of an entire agricultural field, just as that obtainable in an aerial photographing method. Further, the system of the present invention also tries to provide some enlarged local pictures which have improved resolution.

According to the present invention, there is provided a picture napping system comprises a vehicle adapted to travel on an agricultural field; a camera mounted on the vehicle for continuously taking pictures of various portions of the agriculture field; a computer mounted on the vehicle for receiving and processing pictures taken by the camera; and GPS receiver means for receiving information signals transmitted from GPS satellites and/or GPS base stations. In particular, the camera is moved continuously by the vehicle travelling on the field, the pictures taken by the camera are continuously fed into the computer, positional information signals transmitted from GPS satellites and/or GPS base stations are also fed to the computer to determine the positions and the orientations of various pictures taken by the camera, thereby synthesizing together the pictures on the display of the computer to obtain an overall picture representing the entire field.

In one aspect of the present invention, the GPS positional information signals are used and pictures taken by the camera are automatically inputted into the computer for each optionally determined distance on the field.

In another aspect of the present invention, the pictures taken by the camera are synthesized on the display of the computer to obtain a synthesized picture representing the entire field, and any point of the synthesized picture may be locally enlarged by mouse-clicking thereon.

In a further aspect of the present invention, the camera is a video camera or a digital camera, all being able to perform a communication with the computer.

In a still further aspect of the present invention, the computer is a personal computer capable of receiving pictures taken by the camera, and processing the pictures in accordance with information signals transmitted from GPS satellites and/or GPS base stations.

The above objects and features of the present invention will become better understood from the following description with reference to the accompanying drawings.

DETAILED DESCRIPTION OF THE PREFERRED EMBODIMENTS

As will be described in the following, the picture mapping system of the present invention involves the use of a GPS (Global Positioning System). The mapping system also uses an agricultural vehicle (such as a tractor) 2 mounting a video camera 1, a GPS antenna 4 and a GPS receiver 6. When the vehicle 2 is travelling on an agricultural field, photographing operation is continuously performed so as to take pictures of various local portions on the field. Then, in accordance with positional informations transmitted from the GPS, it is allowed to calculate a relationship among the positions of the pictures taken, to reduce the size of each picture and to properly synthesize these pictures together, thereby obtaining a two-dimensional picture representing the entire field.

Figure 1:
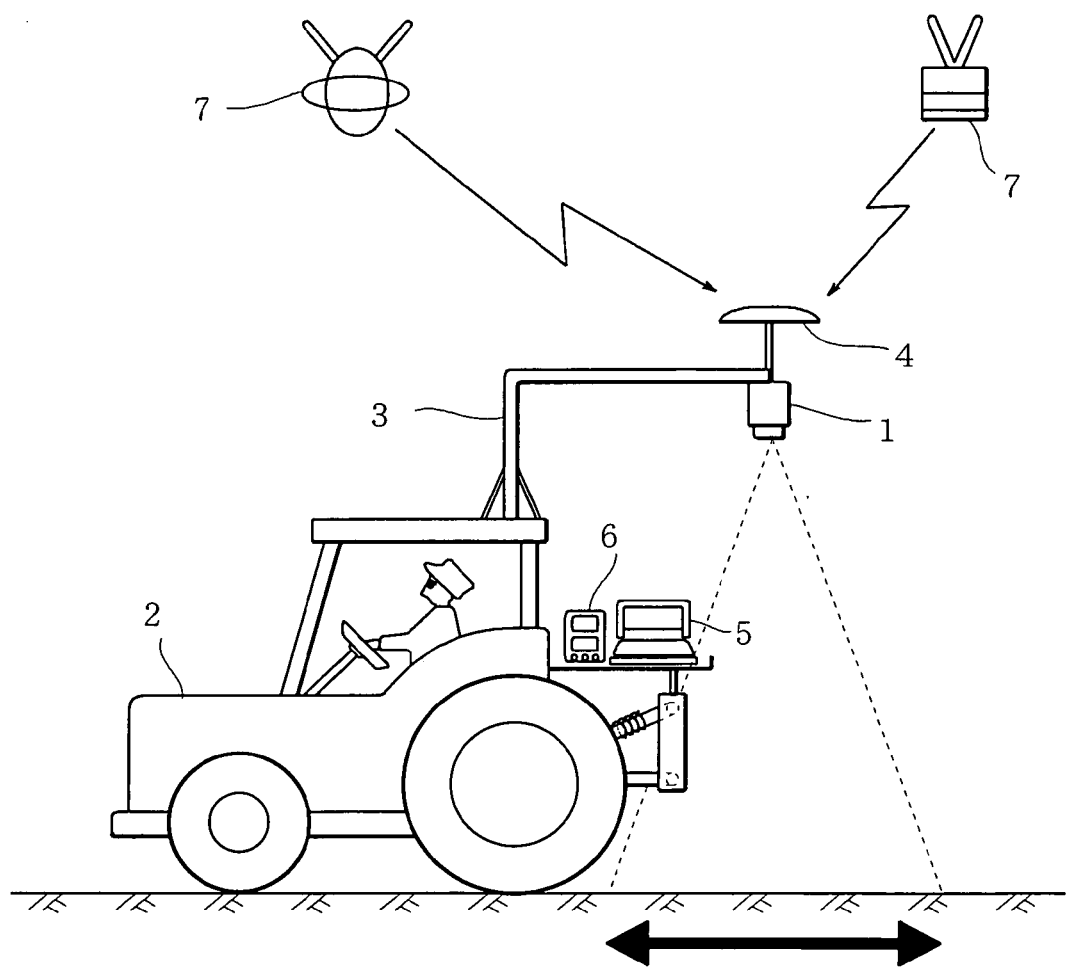
FIG. 1 is an explanatory view schematically showing the picture mapping system of the present invention.

Referring to FIG. 1, the video camera 1 is fixed on a support bracket 3 provided on the roof of the vehicle 2, in a manner such that the camera 1 is facing straight downward. The visual field (detectable area) of the camera 1 may be optionally set within a predetermined range. The GPS antenna 4 is located right above the video camera 1. A personal computer 5, the GPS receiver 6 and other devices such as an electric power source (not shown) are provided on the rear side of the vehicle 2.

In fact, GPS is a system capable of receiving positional information signals transmitted from at least four satellites 7 for calculating 3-dimensional coordinates and the proceeding direction of a signal receiving point (center point of the GPS antenna 4) with a real time. In the present embodiment, positional correction signals are received from base stations, so that the GPS serves as a differential GPS system which can operate with an increased accuracy, with its measuring precision (CEP: Circular Error Probability) being 2 cm (in two-dimensional coordinate system).

Here, the information signals from the GPS are fed to a personal computer 5 through an RS232-C interface, but it is also allowed to use other sort of interface. The video camera 1 may be any type of an image pickup device provided that it can be connected to the personal computer 5. Further, in place of the video camera 1, it is also allowed to use a digital camera capable of performing a communication with the personal computer 5. Moreover, it is further possible to use a camera which can detect not only a visible light having a certain wavelength, but also some non-visible lights such as an ultraviolet light and an infrared light having different wavelengths.

Figure 2:
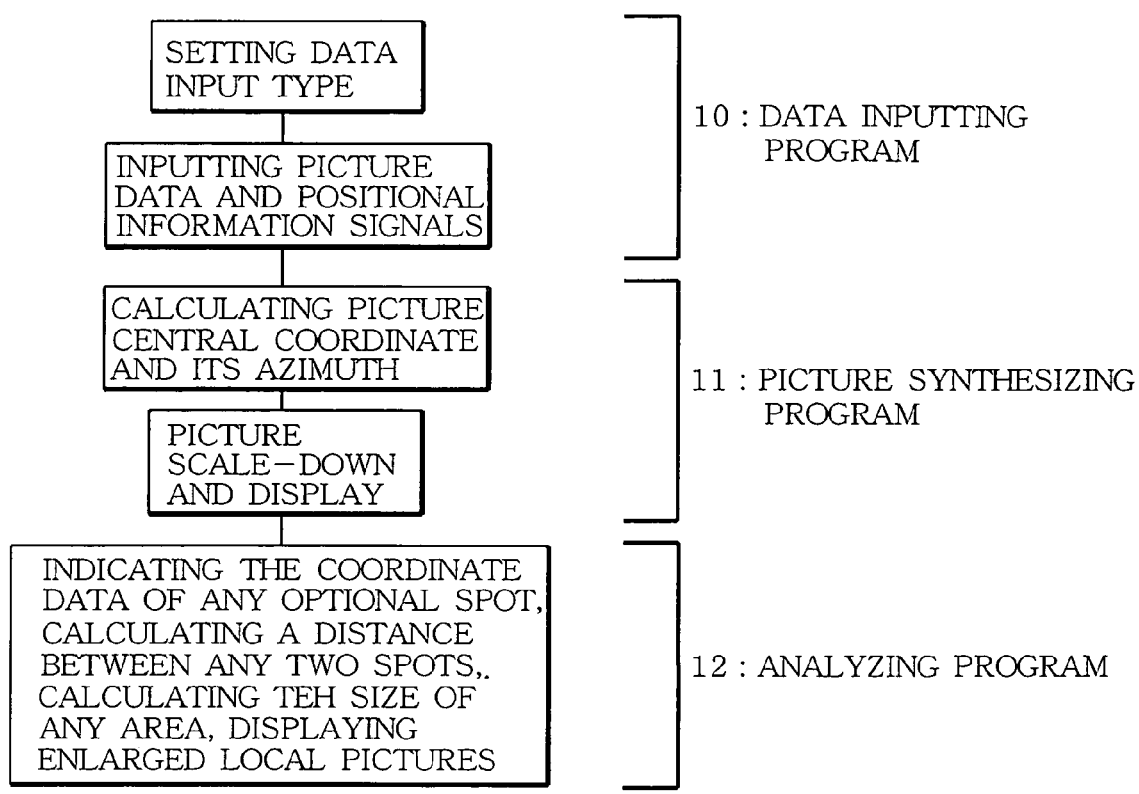
FIG. 2 is a flow chart schematically showing the operation of the picture mapping system.

FIG. 2 is a flow chart schematically showing the operation of the picture mapping system. As shown in FIG. 2, the picture mapping system comprises a data inputting program 10 for inputting picture data and positional information signals (which are all obtained when the video camera 1 is in its movement), a picture synthesizing program 11 for synthesizing the local pictures taken, and an analyzing program 12 for indicating the coordinate data of any point on a synthesized picture and for indicating an enlarged local picture of any spot on the field.

At the first, the information inputting program 10 is started. Then, the type and value of an interval for feeding picture data are set by means of a dialogue box shown in FIG. 3. In detail, the type of an interval for feeding picture data may be a time mode and a distant mode. The time mode operates by using a clock contained in the personal computer, and the distant mode is used to calculate a travelled distance of the vehicle 2, using the positional information signals provided by the GPS.

In order that pictures of all portions of an entire agriculture field may be synthesized together without any lacking, it is preferred that each picture be taken in a range which is slightly smaller than a detectable range along the proceeding direction of the video camera 1 (see FIG. 1), such that all the pictures taken may be slightly overlapped one by another.

When a time mode is selected, the speed of the vehicle 2 is required to be kept substantially constant. However, if certain spots on the field are needed to be investigated in more detail than other ares on the field, the time mode is selected and controlled such that the vehicle 2 will travel at a low speed when passing though these spots (to be investigated in more detail), thus making it possible to take many local pictures. On the other hand, if the distant mode has been selected, there will not be any speed limit on the vehicle 2, so that the vehicle is allowed to have a change in its speed and stop at any area and any time.

Meanwhile, the pictures taken are numberred automatically and continuously, and are stored in a hard disk of the personal computer 5, together with the positional informations from the GPS (which are also stored in the hard disk). Although in the present embodiment the pictures taken are stored in the formality of bmp, they may also be stored in other formality. Here, positional informations include year, month, date and time (when pictures were taken), vehicle proceeding direction (picture azimuth), latitude, longitude.

Figure 4:
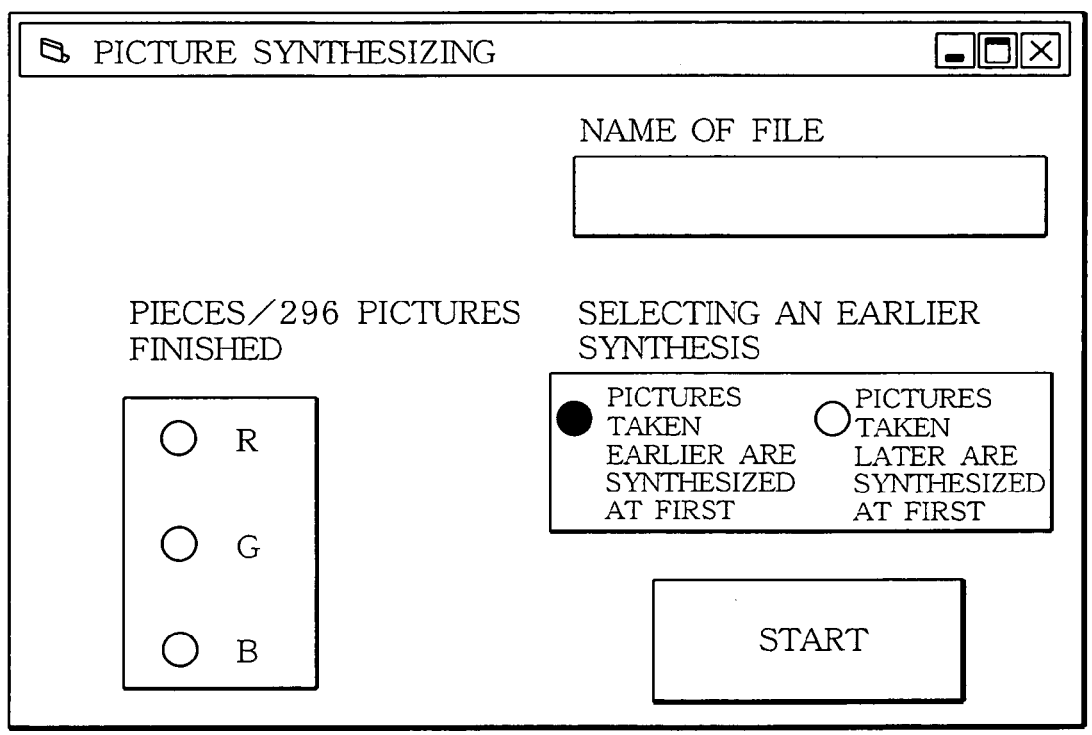
FIG. 4 is a front view schematically showing a dialogue box for synthesizing pictures.

After photographing operation is finished, the picture synthesizing program 11 is started so that all the pictures taken are reduced in their sizes so as to have all the pictures included in only one display. At this time, by virtue of the picture synthesizing dialogue box shown in FIG. 4, a selection may be made so that the pictures taken earlier are synthesized at first or the pictures taken later are synthesized at first. In this way, even if the image of the vehicle 2 will partly enter the pictures taken, the partly entered portions of the image of the vehicle 2 may disappear (since one picture is partially overlapped by part of another.

The analyzing program 12 is provided to indicate the coordinate data of any point on a synthesized picture, calculate a distance between any two points on the synthesized picture, and calculate the size of any area on the synthesized picture. In this manner, the synthesized picture can serve as a collection containing many size-reduced local pictures, so that when any of the size-reduced local pictures on the computer display is mouse-clicked, the size-reduced local picture can be enlarged back to its original size so as to be clearly displayed.

Figure 5:
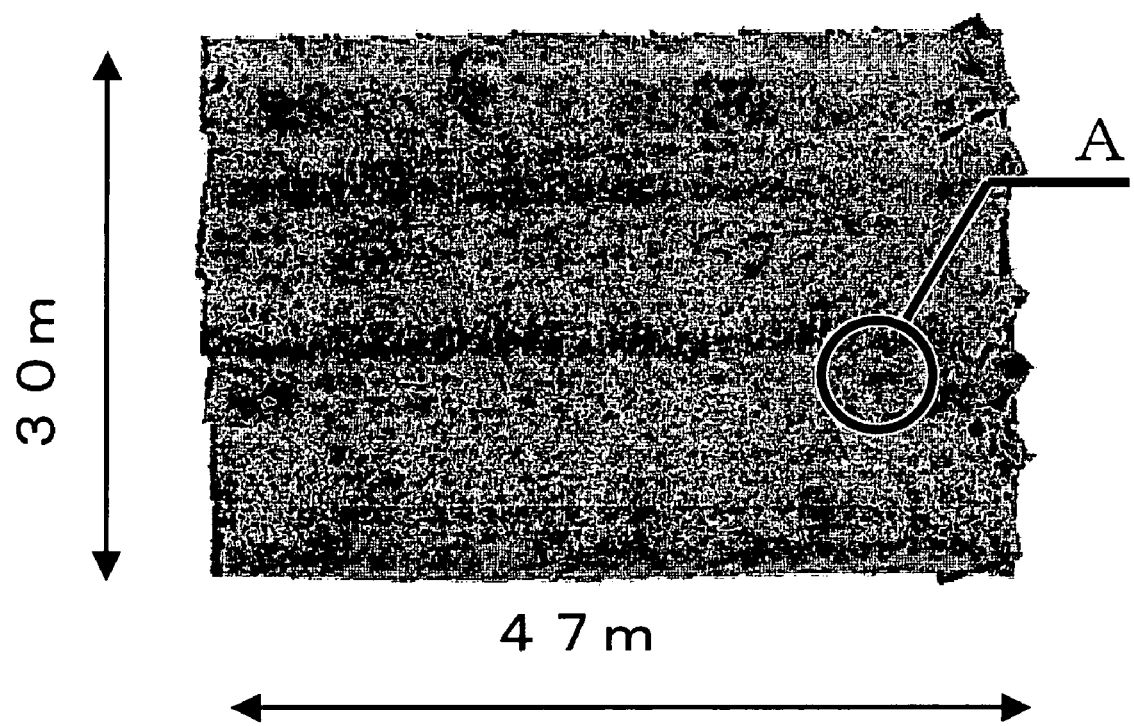
FIG. 5 is a view showing a synthesized picture map synthesized by using the picture mapping system of the present invention.

FIG. 5 is used to indicate an example in which 128 local pictures taken on a field (having an area of 15 ares) have been synthesized by using the system of the present invention. In fact, the shape of the field and its color shade are just the same as those in an aerial photograph.

Figure 6:
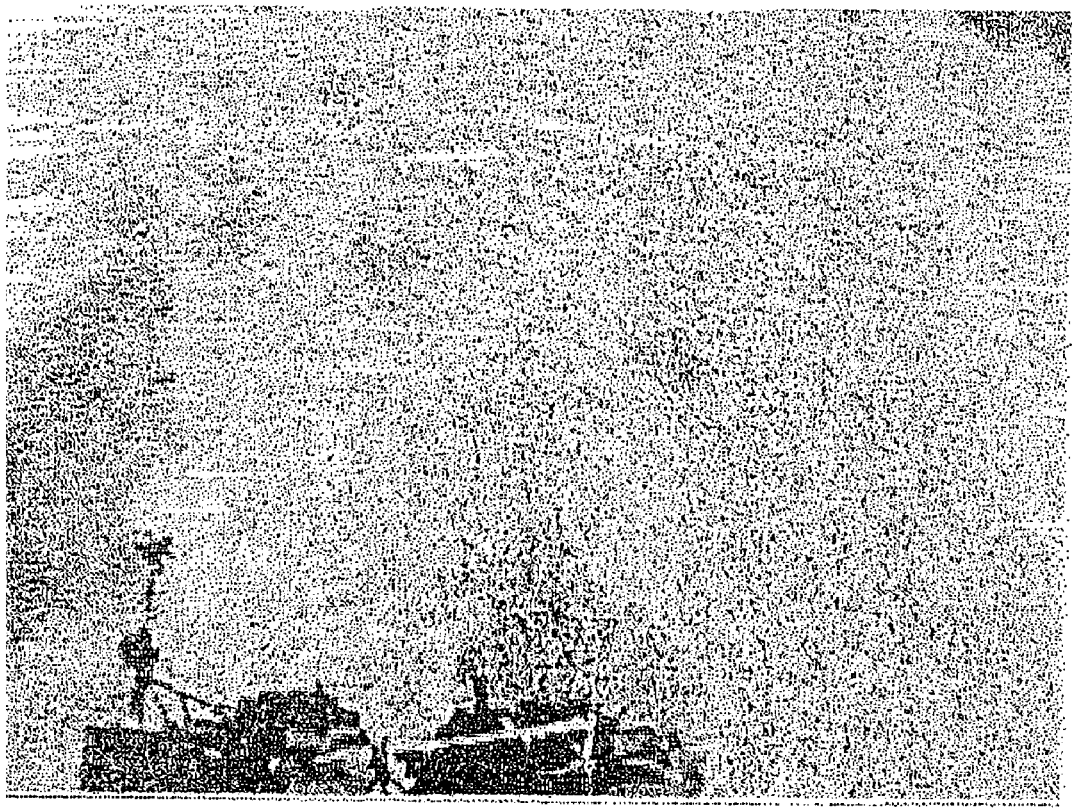
FIG. 6 is a view showing an enlarged local picture of point A in FIG. 4.

FIG. 6 is an enlarged picture of a point A in FIG. 5. As shown in FIG. 6, although the vehicle 2 mounting the video camera 1 is shown in the picture, since each earlier picture is partially (¼) overlapped by a later picture during a picture synthesizing process, the image of the vehicle 2 will not be shown in a synthesized picture of an entire agricultural field, thereby avoiding any possible trouble in picture analysis process.

Figure 3:
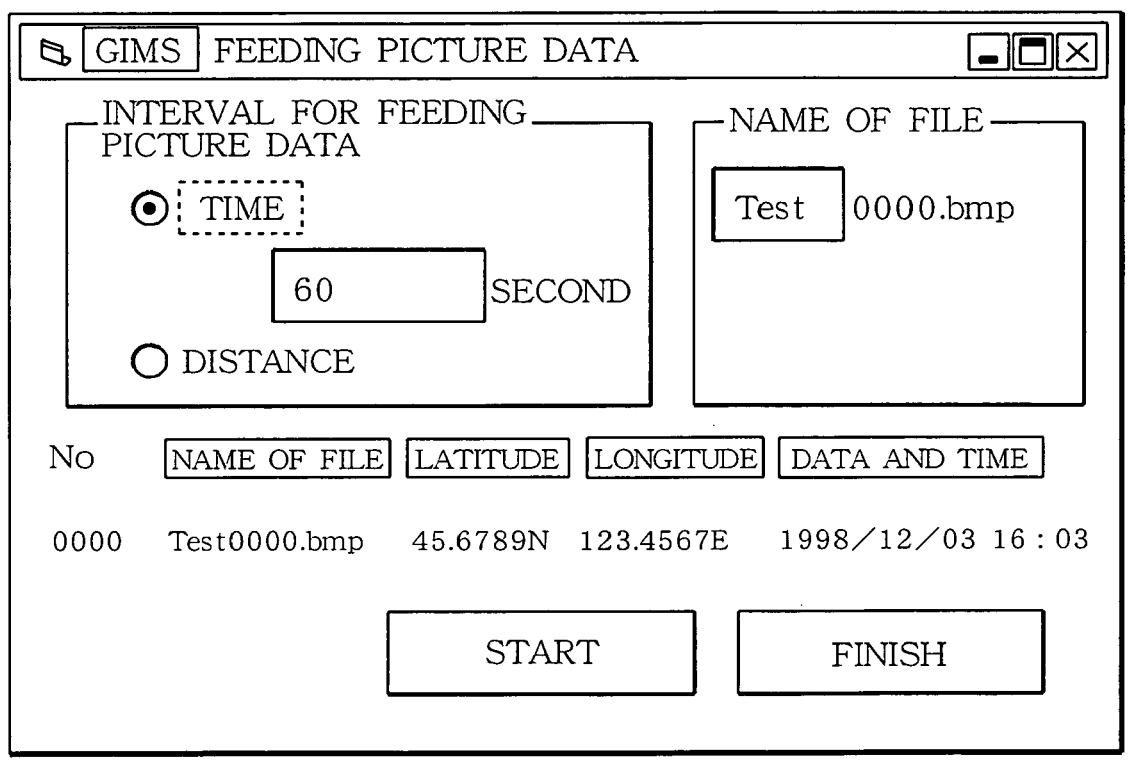
FIG. 3 is a front view schematically showing a dialogue box for setting input manner.
Figure 7:
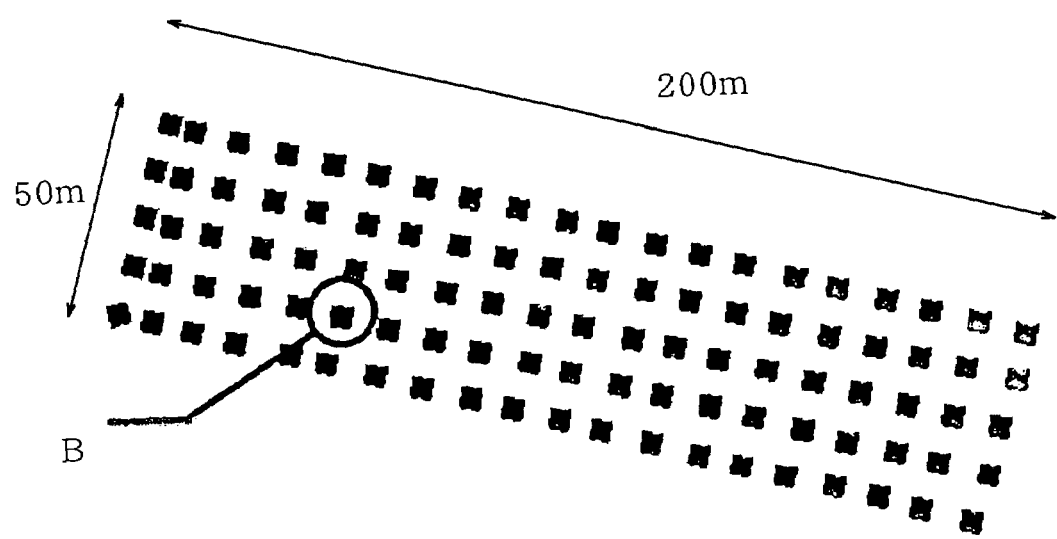
FIG. 7 is a picture map taken intermittently on an agriculture field.

With the use of the picture mapping system of the present invention, it is possible to take pictures intermittently from place to place, avoiding an undesired repetition of taking the same picture at the same position on the field. Referring to FIG. 7, on 1-hectare paddy field on which seeds have just taken roots, a photographing operation is performed automatically from one block (a 1-meter square area) to another and from one row (each row having a length of 10 m) to another, followed by synthesizing the pictures taken, with the synthesized result shown in FIG. 7. In fact, the above operation may be made easy if the visual field of the video camera 1 is adjusted to be coincident with the 1-meter square area and the dialogue box shown in FIG. 3 is operated so that a moving mold is selected and a photographing interval is set at 10 mm.

Figure 8:
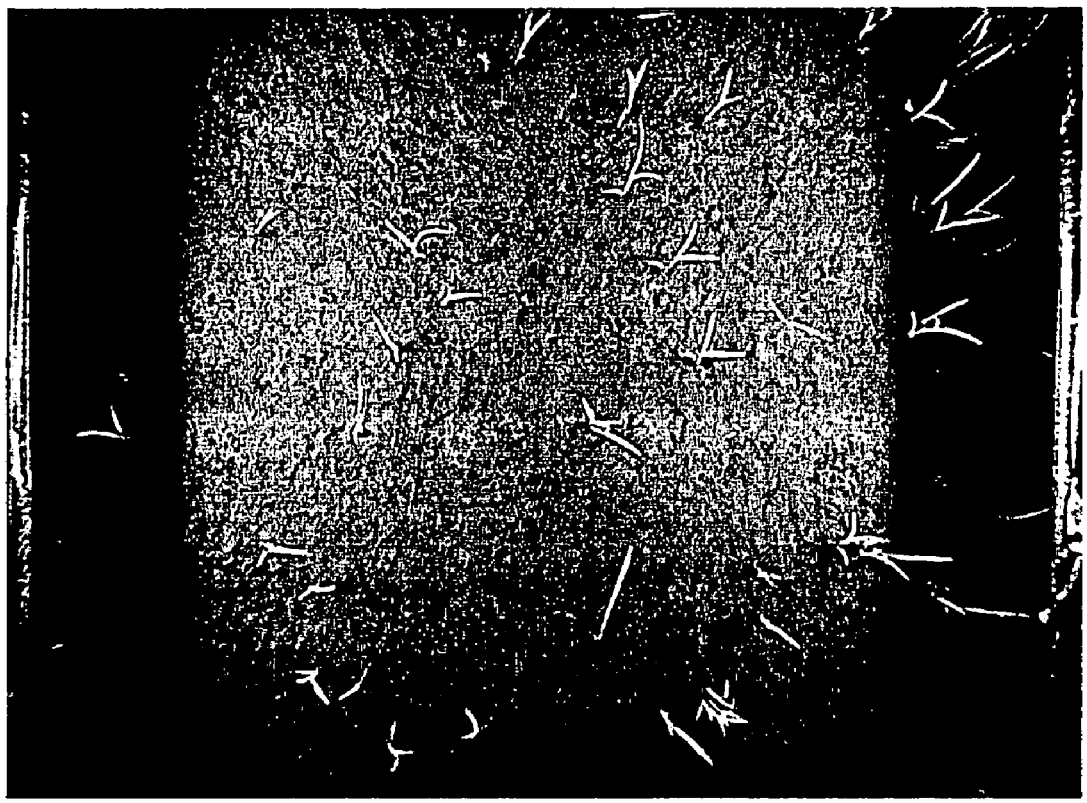
FIG. 8 is a view showing an enlarged local picture of point B in FIG. 7.

FIG. 8 is an enlarged picture showing point B in FIG. 7. As may be understood from FIG. 8, with the use of the system according to the present invention, it is possible to measure the number of rice seedlings on each unit area and to measure the projected area of these seedlings, thereby making it possible to produce a map showing the number of seedlings distributed in the photographed area. A reason as to why the visual field of the video camera should be set at 1-meter square area may be explained as follows. That is, the detectable area of the video camera 1 is necessary to be covered by a rectangular-shaped douser, so as to prevent the surface of a selected photographed area from being influenced by surrounding lights.

As may be understood from the above description, with the use of the picture mapping system of the present invention, an agriculture vehicle (carrying a video camera, a personal computer, a GPS signal receiver and a GPS antenna) is allowed to travel on an agricultural field so as to continuously take a great number of local pictures. Then, in accordance with information signals transmitted from the GPS, the local pictures taken can be reduced in their sizes so as to be synthesized properly, thereby making it possible to produce a synthesized picture representing the entire field. In this way, the photographing operation may be performed smoothly without being affected by wether conditions, making it possible to obtain a two-dimensional picture similar to an aerial photograph. Further, as advantages obtainable from the present invention but not from aerial photographing method, the system of the present invention can provide enlarged local pictures, thereby making it possible not only to grasp crop growing environment and crop growing state, but also to investigate and analyze in detail any specific areas on the field.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A picture mapping system comprising:
    a vehicle adapted to travel on an agricultural field;
    a camera mounted on the vehicle for continuously taking pictures of various portions of the agriculture field;
    a computer mounted on the vehicle for receiving and processing pictures taken by the camera; and
    GPS receiver means for receiving information signals transmitted from GPS satellites and/or GPS base stations;
    wherein the camera is moved continuously by the vehicle traveling on the field, the pictures taken by the camera are continuously fed into the computer, positional information signals transmitted from GPS satellites and/or GPS base stations are also fed to the computer to determine the positions and the orientations of various pictures taken by the camera, thereby synthesizing together the pictures on the display of the computer to obtain an overall picture representing the entire field,
    wherein the pictures are fed at intervals which are time mode and distance mode, with the time mode operating by using a clock contained in the computer and the distance mode operating by using positional information signals provided by GPS.

2. A picture mapping system according to claim 1, wherein the GPS positional information signals are used and pictures taken by the camera are automatically inputted into the computer for each optionally determined distance on the field.

3. A picture mapping system according to claim 1, wherein the pictures taken by the camera are synthesized on the display of the computer to obtain a synthesized picture representing the entire field, and any point of the synthesized picture may be locally enlarged by mouse-clicking thereon.

4. A picture mapping system according to claim 1, wherein the camera is a video camera or a digital camera, all being able to perform a communication with the computer.

5. A picture mapping system according to claim 1, wherein the computer is a personal computer capable of receiving pictures taken by the camera, and processing the pictures in accordance with information signals transmitted from GPS satellites and/or GPS base stations.

* * * * *